(12) United States Patent
Nakayama et al.

(10) Patent No.: US 7,894,808 B2
(45) Date of Patent: Feb. 22, 2011

(54) STORING APPARATUS AND TELECOMMUNICATIONS APPARATUS

(75) Inventors: Takehiro Nakayama, Yokohama (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 826 days.

(21) Appl. No.: 10/989,572

(22) Filed: Nov. 17, 2004

(65) Prior Publication Data

US 2005/0136968 A1    Jun. 23, 2005

(30) Foreign Application Priority Data

Nov. 27, 2003    (JP)    ............................. 2003-398028

(51) Int. Cl.
| | |
|---|---|
| H04M 3/00 | (2006.01) |
| H04M 1/66 | (2006.01) |
| H04M 1/68 | (2006.01) |
| H04M 3/16 | (2006.01) |
| H04M 1/00 | (2006.01) |
| H04M 11/00 | (2006.01) |
| H04M 3/42 | (2006.01) |
| H04B 1/38 | (2006.01) |
| H04B 7/14 | (2006.01) |
| H04J 1/10 | (2006.01) |
| H04J 3/08 | (2006.01) |
| H04W 4/00 | (2009.01) |
| H04L 12/14 | (2006.01) |
| G06F 11/30 | (2006.01) |
| G06F 12/14 | (2006.01) |

(52) U.S. Cl. ...................... 455/419; 455/411; 455/418; 455/550.1; 455/558; 370/315; 370/329; 379/93.01; 379/218.01; 713/170; 713/189

(58) Field of Classification Search ................... 379/58, 379/61, 63, 93, 96, 98; 340/825.22, 825.44, 340/825.54; 455/66, 68, 69, 70, 88, 89, 90.3, 455/127, 186, 411, 414.1, 418, 419, 420, 455/423, 67.11, 550.1, 757.1, 410, 412.1, 455/415, 416, 417, 422.1, 426.1, 435.2, 456.1, 455/466, 557, 575.1, 2.01, 41.2, 404.1, 414.2, 455/509, 519, 524, 550, 558, 566, 574, 12.1, 455/41.1; 370/311, 315, 328, 331, 338, 349, 370/373, 401, 469, 329, 260, 312, 352, 354, 370/392, 466; 713/166, 189, 2, 151, 170, 713/171, 175, 176, 186, 187; 717/168–178; 705/64; 709/206, 216, 220, 225; 714/758
See application file for complete search history.

(56) References Cited

U.S. PATENT DOCUMENTS

| | | | | |
|---|---|---|---|---|
| 5,418,837 | A | * | 5/1995 | Johansson et al. ............ 455/558 |
| 5,689,825 | A | * | 11/1997 | Averbuch et al. ............. 455/418 |
| 5,974,312 | A | * | 10/1999 | Hayes et al. ................. 455/419 |
| 6,023,620 | A | * | 2/2000 | Hansson ...................... 455/419 |
| 6,052,600 | A | * | 4/2000 | Fette et al. ................... 455/509 |
| 6,344,727 | B1 | | 2/2002 | Desai et al. |
| 7,031,695 | B2 | * | 4/2006 | Aono et al. .................. 455/411 |
| 7,379,919 | B2 | * | 5/2008 | Hogan et al. ................... 705/64 |
| 7,386,304 | B2 | * | 6/2008 | Alvarado et al. ............. 455/418 |
| 2001/0044331 | A1 | | 11/2001 | Miyoshi et al. |
| 2002/0046343 | A1 | * | 4/2002 | Deo et al. ..................... 713/189 |
| 2002/0137501 | A1 | * | 9/2002 | Datar et al. ................... 455/419 |
| 2002/0193107 | A1 | * | 12/2002 | Nascimento, Jr. ............ 455/426 |
| 2003/0181168 | A1 | * | 9/2003 | Herrod et al. ................ 455/90.3 |
| 2004/0081110 | A1 | * | 4/2004 | Koskimies .................... 370/315 |
| 2004/0157638 | A1 | * | 8/2004 | Moran et al. ............... 455/550.1 |
| 2005/0262418 | A1 | * | 11/2005 | Gehrmann .................... 714/758 |

FOREIGN PATENT DOCUMENTS

| | | | |
|---|---|---|---|
| EP | 1 175 112 A1 | | 1/2002 |
| EP | 1175112 A1 | * | 1/2002 |
| EP | 1 349 049 A1 | | 1/2003 |
| EP | 1349049 A1 | * | 10/2003 |
| JP | 2002-207599 | | 7/2002 |
| JP | 2003-188951 | | 7/2003 |

| | | |
|---|---|---|
| JP | 2005-057311 | 3/2005 |
| WO | WO 02/17073 A1 | 2/2002 |

OTHER PUBLICATIONS

"Development Guideline for i-mode based Java Contents, Detailed Version, Edition 1.1", [online], May 14, 2001, URL: http://www.nttdocomo.co.jp/p_s/imode/java/pdf/jguide010514.pdf (with English Abstract).
"RFC2616 Hypertext Transfer Protocol-HTTP/1.1", [online], Jun. 1999, at http://www.ietf.org/rfc/rfc2616.txt, 134 pages.
Yasushi Nakayama, et al., "Information Security Technologies and Security Assessment for Digital Money", IMES Discussion Paper Series 98-J-26, Bank of Japan, Financial Research Center, Nov. 1998, pp. 57-114 (with English Abstract).
"Trusted Computing Platform Alliance (TCPA) Main Specification Version 1.1a"Compaq Computer Corporation, Hewlett-Packard Company, IBM Corporation, Intel Corporation, and Microsoft Corporation, [online], Feb. 22, 2002, Internet, URL:HTTP://trustedcomputing.org/docs/main%20v1_1b.pdf.
Siani Pearson, et al., "Trusted Computing Platforms: TCPA Technology in Context", Prentice Hall PTR, ISBN 0-13-009220-7, Jul. 2002, 2 pages.

\* cited by examiner

*Primary Examiner*—Andrew Wendell
*Assistant Examiner*—Paul P Tran
(74) *Attorney, Agent, or Firm*—Oblon, Spivak, McClelland, Maier & Neustadt, L.L.P.

(57) ABSTRACT

A secret information storing unit stores a common key which is authenticated between the data storing apparatus and a telecommunications apparatus. A data communication unit receives data from the telecommunications apparatus. The data includes an update of a first data item which is downloaded by the telecommunications apparatus from an information provider via a wireless network and encrypted using the common key. A data storage stores the encrypted update of the first data item received at the data communication unit, and further detaches from the data storing apparatus and independently connects directly to the telecommunications apparatus. The data communication unit sends the encrypted update of the first data item stored in the data storage to the telecommunications apparatus in response to a request from the telecommunications apparatus.

12 Claims, 10 Drawing Sheets

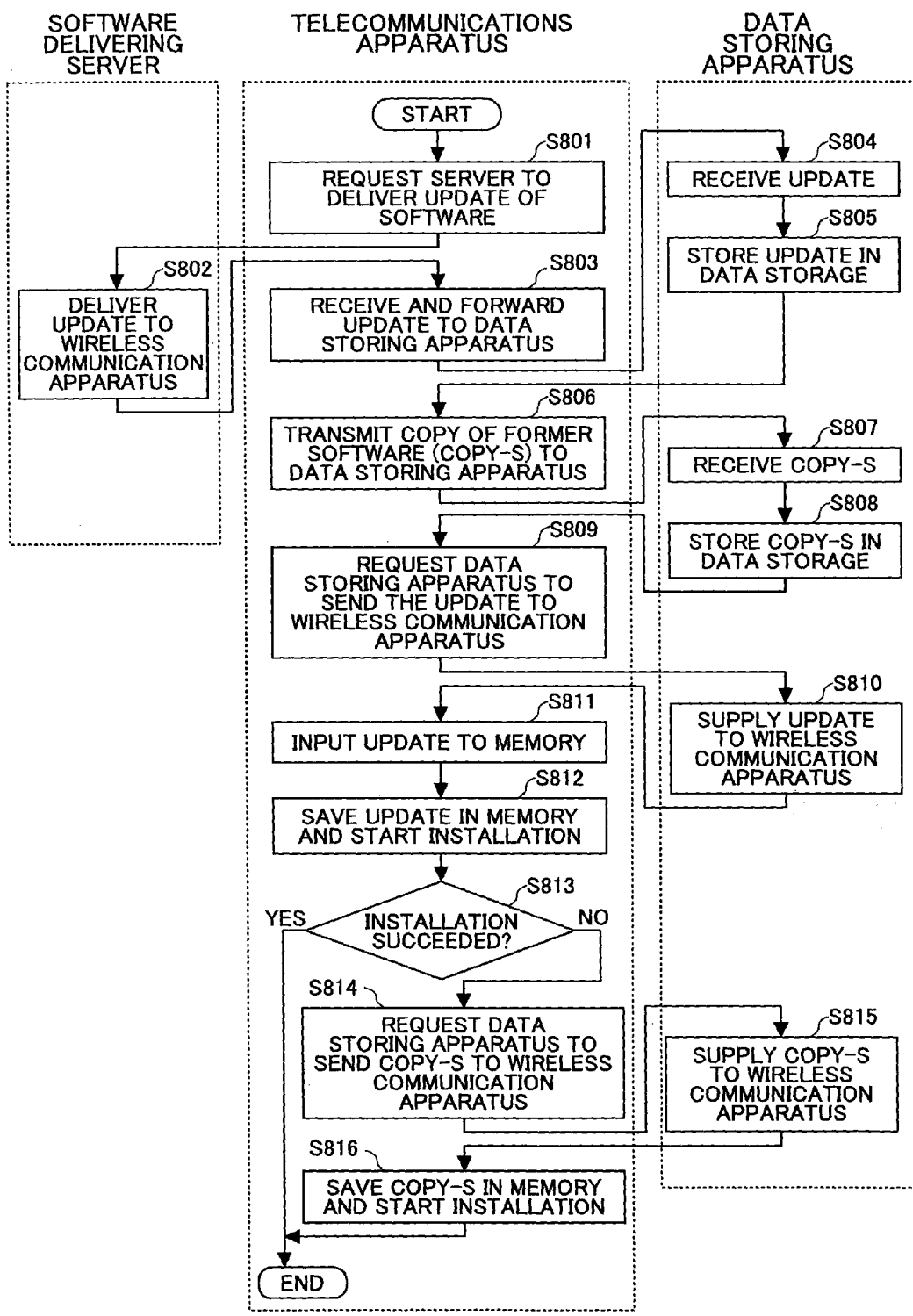

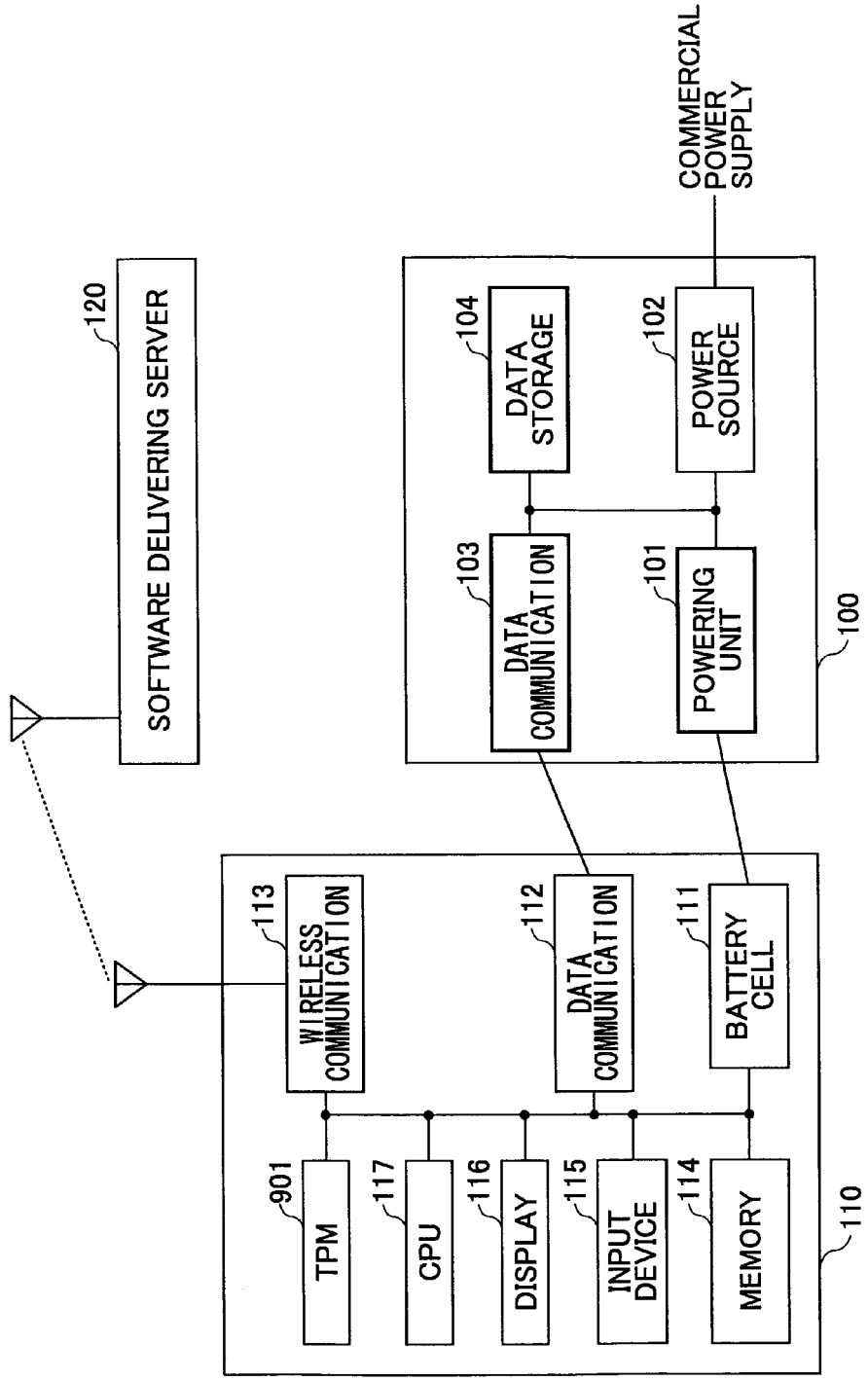

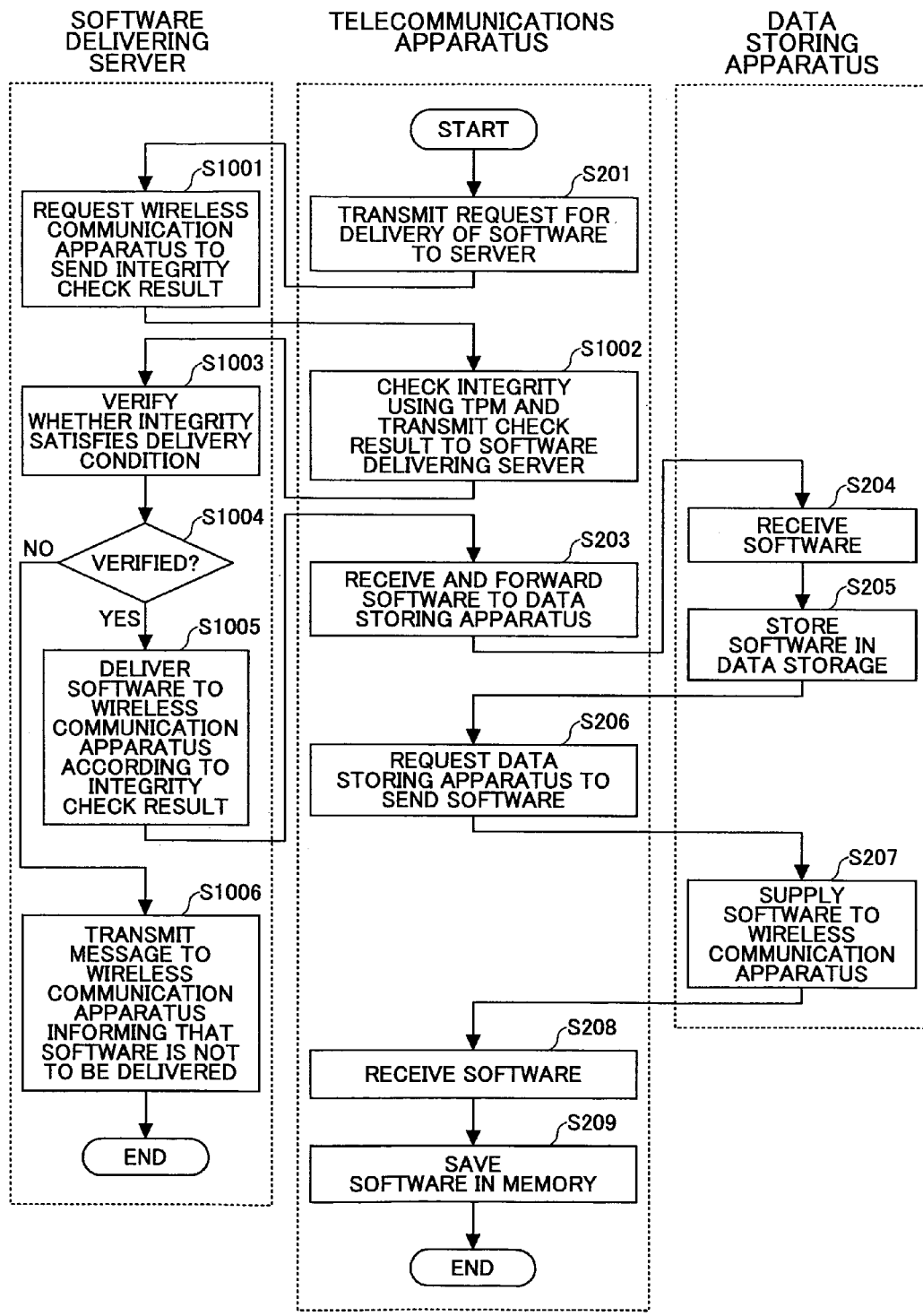

STORING APPARATUS AND TELECOMMUNICATIONS APPARATUS

FIELD OF THE INVENTION

The present invention generally relates to a telecommunications aiding tool, and more particularly, to a device for allowing a telecommunications apparatus to download software via a wireless network in a reliable manner.

BACKGROUND OF THE INVENTION

Many efforts have been made to expand the performances of telecommunications apparatuses. One example of such efforts is to allow telecommunications apparatuses to receive and install software transmitted from a server via a wireless network.

In fact, services for allowing cellular phones to download software, such as electronic games, from software delivering servers via cellular networks and allowing the users to execute the software as necessary are widely spreading.

Since such services are strongly dependent on and affected by the radio environment of the cellular networks, data transmission is often interrupted during the download process as cellular phones move around. In this case, the entire file of the software cannot be downloaded due to interruption. To avoid this, it is proposed to discard the downloaded software when transmission is interrupted during the download operation and to restore the cellular phone to the previous state immediately before the download is started. See, for example, "i-mode basis Java (registered trademark) Contents Development Guideline, Detailed Version, Edition 1.1", [online], May 14, 2001. This technique protects the cellular phone from damage even if data communication is interrupted during the download process.

However, if the download process ends in failure due to interruption, the user of the cellular phone has to repeat the download process until the software is successfully downloaded. The larger the volume of software, the longer the download time required, and the greater is the probability of interruption.

In addition, when the battery of the cellular phone runs out during the download process, the download again ends in failure.

The same applies to the updating process. To update the software installed in a cellular phone using a downloaded change data file, the change data file is compared with the existing data file of the already installed software to specify the difference. If an error occurs when updating the software, it is necessary to restore the former data existing before the update. For this reason, the data file of the installed software has to be saved in the memory before the update process is started, and a large memory area is required. However, it is difficult to provide a sufficient amount of surplus memory to cellular phones because of the constraint of the housing size.

SUMMARY OF THE INVENTION

Therefore, it is an object of the present invention to provide a data storing apparatus and a telecommunications apparatus, which are capable of removing adverse influence caused by various factors, such as interruption of wireless communication, battery shutoff, or lack of memory area, during downloading of software from a wireless network to the telecommunications apparatus.

To achieve the objects, in one aspect of the invention, a data storing apparatus includes:
(a) a powering unit configured to supply power to a telecommunications apparatus connected to the data storing apparatus;
(b) a data communication unit configured to transmit and receive data to and from the telecommunications apparatus, the data including a first data item downloaded by the telecommunications apparatus from an information provider via a wireless network; and
(c) a data storage configured to store the data received at the data communication unit.

In a preferred example, the data storing apparatus may further include a cipher processing unit configured to encrypt and decrypt the data, and a secret information storing unit configured to save an encryption key.

The data communication unit of the data storing apparatus receives a second data item that has been stored in the telecommunications apparatus when the first data item is updated in the telecommunications apparatus. In this case, the data storage stores the second data item until the updating is completed in the telecommunications apparatus.

The data communication unit of the data storing apparatus transmits the second data item to the telecommunications apparatus when the second data item is required to boot the telecommunications apparatus.

In the second aspect of the invention, a telecommunications apparatus is provided. The telecommunications apparatus includes:
(a) a wireless communication unit configured to transmit and receive data via a wireless network to and from an information provider;
(b) a data communication unit connected to an external data storing apparatus to transmit the data to the data storing apparatus and receive the data from the data storing apparatus when required at the telecommunications apparatus; and
(c) a battery cell configured to receive power being supplied from the data storing apparatus.

In a preferred example, the telecommunications apparatus may further include an integrity measuring unit that measures integrity of the telecommunications apparatus. In this case, the wireless communication unit transmits a measuring result of the integrity to the information provider via the wireless network.

The data storing apparatus provides secure downloading of data from a wireless network. The telecommunications apparatus can download the data (such as software) from the wireless network, while preventing adverse influence of various factors, including interruption of wireless communication, battery shutdown, and lack of memory area.

BRIEF DESCRIPTION OF THE DRAWINGS

Other objects, features, and advantages of the invention will become more apparent from the following detailed description when read in conjunction with the accompanying drawings, in which

FIG. 8 illustrates data flow and operations flow among the server, the telecommunications apparatus, and the data storing apparatus when downloading and installing software into the telecommunications apparatus according to the fifth embodiment of the invention;

FIG. 9 is a block diagram illustrating a data storing apparatus and a telecommunications apparatus according to the sixth embodiment of the invention; and FIG. 10 illustrates data flow and operations flow among the server, the telecommunications apparatus, and the data storing apparatus when downloading software according to the sixth embodiment of the invention.

DETAILED DESCRIPTION OF THE PREFERRED EMBODIMENT

Figure 1:
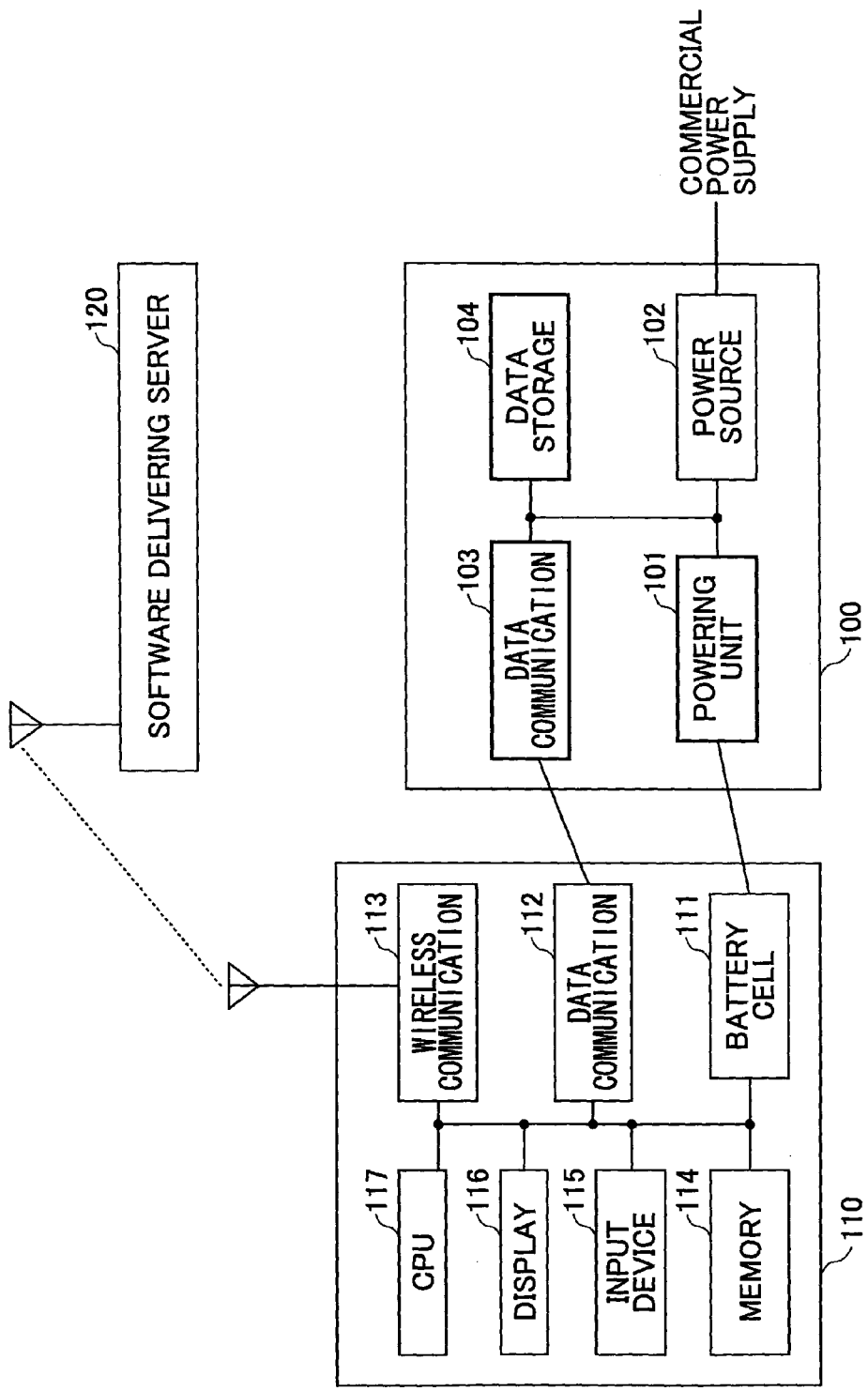
FIG. 1 is a block diagram illustrating a data storing apparatus and a telecommunications apparatus according to the first embodiment of the invention.

The present invention is described in detail below in conjunction with the attached drawings. In the drawings, the same elements with the same functions are denoted by the same numerical references to avoid repetition of the same explanation.

FIG. 1 is a block diagram illustrating a data storing apparatus 100 and a telecommunications apparatus 110 according to the first embodiment of the invention.

In the first embodiment, the telecommunications apparatus 110 is a portable radio communication apparatus, such as a personal digital assistant (PDA) with wireless communication performance, a cellular phone, or a personal handy phone system (PHS).

The telecommunications apparatus 110 includes a battery cell 111, a data communication unit 112, a wireless communication unit 113, a memory 114, an input device 115, a display 116, and a central processing unit (CPU) 117.

The battery cell 111 supplies power required for the telecommunications apparatus 110 to operate. The battery cell 111 comprises, for example, a secondary lithium-ion battery, and it can be used repeatedly through electrical charging.

The data communication unit 112 transmits and receives data, including software, to and from the data storing apparatus 100 using a connector, a cable, or a short-range wireless communication technique. Examples of the short-range wireless communication technique include Bluetooth, infrared data association (IrDA), ISO 15693, and ISO 14443.

The wireless communication unit 113 transmits and receives data, including software, to and from a software delivering server 120 via a wireless network, such as a cellular network, a PHS network, or a wireless LAN.

The memory 114 is an arbitrary data-storage medium, such as a magnetic disk or a flash memory, and stores control software, application software, and other types of software of the telecommunications apparatus 110.

The input device 115 is an arbitrary device for allowing the user of the telecommunications apparatus 110 to input instructions. For example, a keyboard, a button, a microphone, a touch panel, or a pointing device may be used.

The display 116 is, for example, a liquid crystal display or a light emitting diode (LED) display, in which the remaining battery capacity or the signal sensitivity of the radio communication unit 113 is displayed. The display 116 also provides a user interface for downloading software.

The CPU 117 controls the overall operations of the above-described components, and performs arithmetic computation for the telecommunications apparatus 110.

The data storing apparatus 100 includes a powering unit 101, a power source unit 102, a data communication unit 103, and data storage unit 104, which are mutually connected via a data bus.

The powering unit 101 is, for example, a charger that electrically charges the battery cell 111 of the telecommunications apparatus 110. The powering unit 101 and the battery cell 111 are connected to each other via a connector or a cable.

The power source unit 102 converts alternate current supplied from a commercial power supply via a connector (not shown) into direct current, and supplies the direct current to the powering unit 101 and the data storage unit 104.

The data communication unit 103 transmits and receives data, including software, to and from the telecommunications apparatus 110 via a connector, a cable, or a short-range wireless communication technique.

The data storage unit 104 is an arbitrary storage medium, such as a magnetic disk or a flash memory, configured to store data or software programs received at the data communication unit 103. Preferably, the data storage unit 104 is tamper-resistant to securely protect the stored software. By employing a tamper-resistant memory, external physical access to the data storage unit 104 is restricted, making it difficult to modify, alter, or subvert the secret information, or to conduct unauthorized operations diverging from the intended purpose. This arrangement can prevent alteration or theft of the software by third parties. The tamper-resistant data storage unit 104 can be realized by fabricating the device using special materials, or structuring the device using dummy interconnects. See Nakayama, Ohota, and Matsumoto, "Information Security Technology and Security Assessment for Digital Money", IMES Discussion Paper Series 98-J-26, Bank of Japan, Financial Research Center, November 1998.

The data storage unit 104 may be configured so as to be attachable to and detachable from the data storing apparatus 100. For instance, a card-type storage medium (such as a memory card) may be used as the data storage unit 104. This arrangement facilitates replacement, unlike the hard disk drive that requires structural alteration, and the data storage capacity can be changed easily simply by changing the memory card.

The detachable data storage unit (memory card) 104 may be removed from the data storing apparatus 100 and connected to the telecommunications apparatus 110 by itself. In this case, the software stored in the data storing apparatus 100 can be installed in the telecommunications apparatus 110 even when the telecommunications apparatus 110 is disconnected from the data storing apparatus 100. In other words, the telecommunications apparatus 110 is connected to the data storing apparatus 100 when downloading and storing desired software in the data storing apparatus 100. Then, the data storage unit 104 is detached from the data storing apparatus 100 and inserted in the telecommunications apparatus 110 whenever the user wishes to install the software in the telecommunications apparatus 110 even when traveling on the road.

The data storing apparatus may be furnished with a recess on the main body in order to securely hold the telecommunications apparatus 110 during the connection. In this case, the powering unit 101 of the data storing apparatus 100 and the battery cell 111 of the telecommunications apparatus 110 are connected to each other, and connection between the data communication unit 103 of the data storing apparatus 100 and the data communication unit 112 of the telecommunications apparatus 110 are maintained securely.

The software delivering server 120 delivers software to the telecommunications apparatus 110 via a wireless network, such as a cellular network, a PHS network, or a wireless LAN.

In this embodiment, various types of software are stored in advance in the software delivering server 120 by telecommunications carriers, software providers, telecommunication equipment manufacturers or their agents. The software delivering server 120 transmits one or more types of software to the telecommunications apparatus 110 as necessary.

Although, in this embodiment, the telecommunications apparatus 110 downloads software from the software delivering server 120, the invention is not limited to this example. The telecommunications apparatus 110 may download or receive any type of data from other telecommunications apparatuses.

Figure 2:
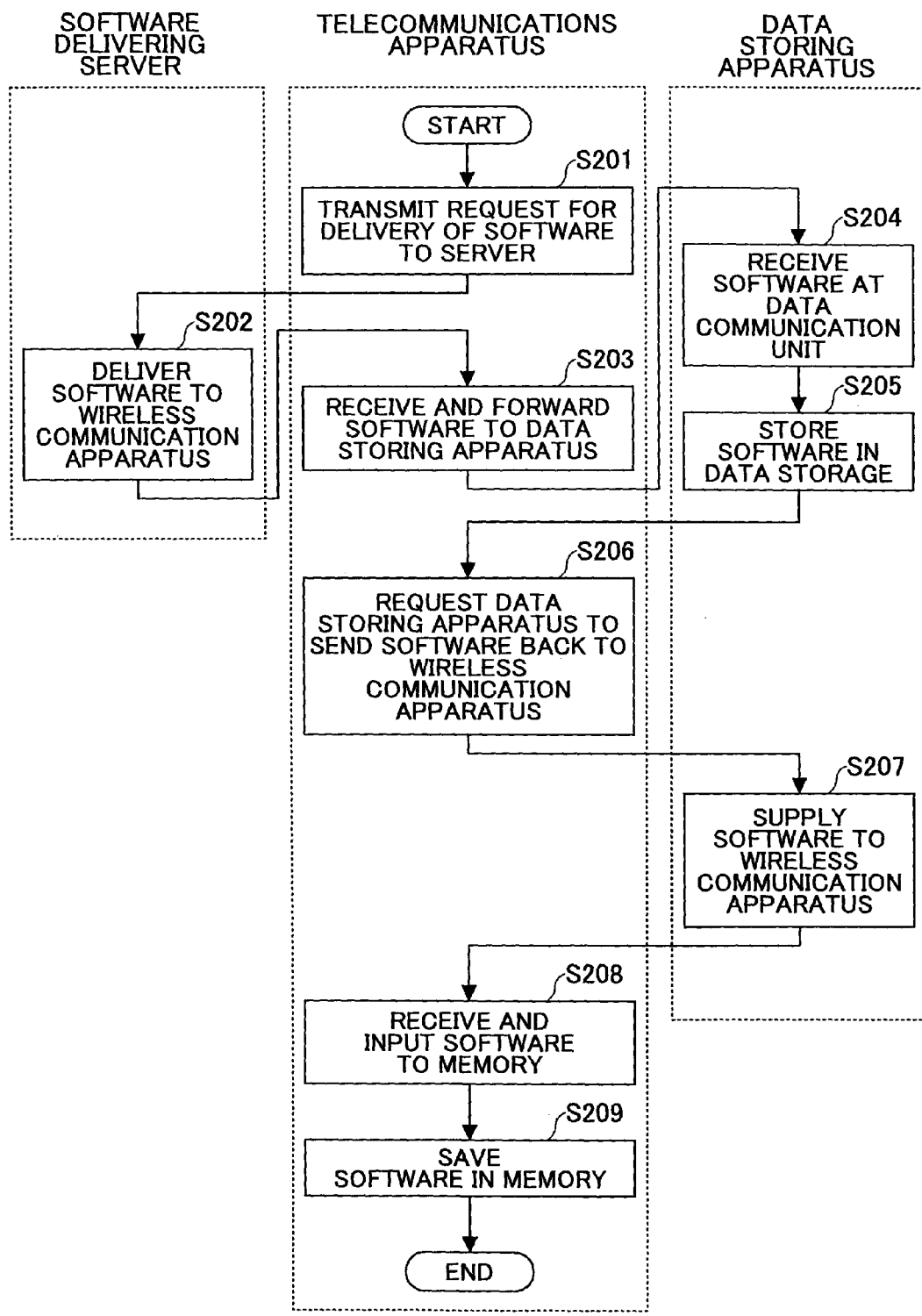
FIG. 2 illustrates data flow and operations flow among the server, the telecommunications apparatus and the data storing apparatus when downloading software from the server to the telecommunications apparatus according to the first embodiment of the invention.

FIG. 2 illustrates data flow among the software delivering server 120, the telecommunications apparatus 110, and the data storing apparatus 100 when the software download operation is carried out by the telecommunications apparatus 110 according to the first embodiment of the invention.

Prior to starting the download of the software, the power source unit 102 of the data storing apparatus 100 is connected to a plug outlet of a commercial power supply (e.g., AC 100 V) via a connector. The powering unit 101 is regularly supplied with direct current from the power source unit 102. The telecommunications apparatus 110 is connected to the data storing apparatus 100 such that the battery cell 111 of the telecommunications apparatus 110 can be electrically charged by the powering unit 101 of the data storing apparatus 100 at any time. This arrangement can prevent failure of the download process due to battery shutoff.

The data communication unit 112 of the telecommunications apparatus 110 is connected to the data storing apparatus 100 via a connector, such as an ANSI standard bus interface (ATA adaptor), so as to allow stable data transmission to and from the data storing apparatus 100. This arrangement prevents failure of the download process due to electrical disconnect between the data storing apparatus 100 and the telecommunications apparatus 110.

Since the data storing apparatus 100 is connected to the fixed plug outlet of a commercial power supply to download software, the location of the data storing apparatus 100, and the location of the telecommunications apparatus 110 connected to this data storing apparatus 100 via a physical connector, are fixed during the download process involving data transmission between the software delivering server 120 and the telecommunications apparatus 110. Accordingly, interruption of download due to change in radio environment can be avoided.

The actual download process starts when the CPU 117 activates a prescribed arithmetic operation to download desired software in accordance with the control program stored in the memory 114.

FIG. 2 illustrates data flow and operations flow among the software delivering server 120, the telecommunications apparatus 110, and the data storing apparatus 100. Upon activation of the download process, the wireless communication unit 113 of the telecommunications apparatus 110 transmits a request for delivery of desired software (S) to the software delivering server 120 (S201).

In response to the request, the software delivering server 120 delivers the software to the telecommunications apparatus 110 (S202).

The telecommunications apparatus 110 receives the software at the wireless communication unit 113, and forwards the received software to the data communication unit 112 consecutively. The telecommunications apparatus 110 transmits the software from the data communication unit 112 to the data storing apparatus 100 (S203).

The data storing apparatus 100 receives the software at the data communication unit 103 and inputs the software to the data storage 104 (S204). The data storage 104 stores the software (S205).

A sequence of communications between the telecommunications apparatus 110 and the software delivering server 120 is conducted based on any existing protocol, such as Hypertext Transfer Protocol disclosed in "RFC2616 Hypertext Transfer Protocol—HTTP/1.1", [online], June 1999.

The session between the telecommunications apparatus 110 and the software delivering server 120 is finished, and the software is stored in the data storage 104 of the data storing apparatus 100. Then, the telecommunications apparatus 110 requests the data storing apparatus 100 to send the software to the telecommunications apparatus 110 (S206).

In response to the request, the data storing apparatus 100 supplies the software stored in the data storage 104 from the data communication unit 103 to the telecommunications apparatus 110 (S207). After the transmission of the software, the software may be deleted from the data storage 104, or alternatively, continuously maintained in the data storage 104.

The telecommunications apparatus 110 receives the software at the data communication unit 112, and supplies the software to the memory 114 (S208). The memory 114 stores the software (S209).

In the above-described operations flow, the telecommunications apparatus 110 automatically requests the data storing apparatus 100 to send the software upon completion of storing the software in the data storage 104 of the data storing apparatus 100. However, a request for the software may be transmitted from the telecommunications apparatus 110 to the data storing apparatus 100 based on an instruction from the user.

Figure 6:
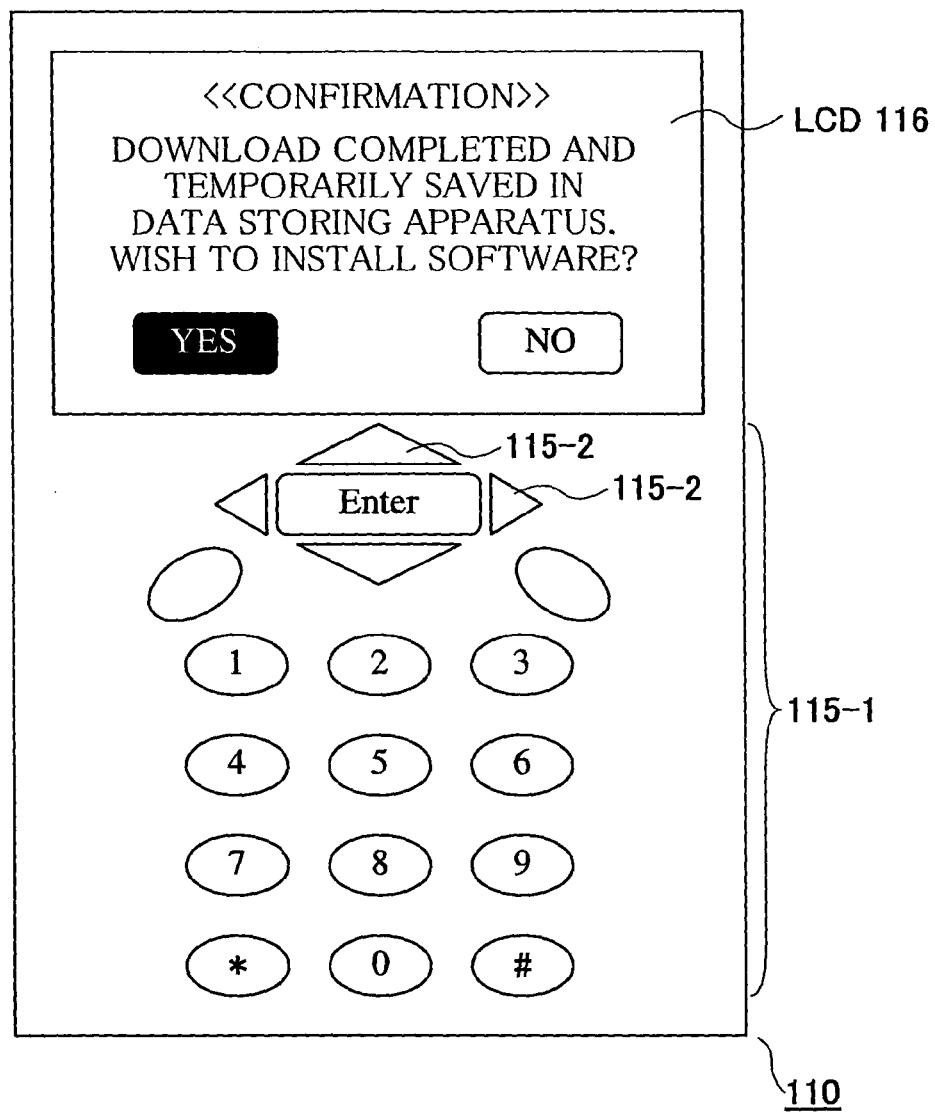
FIG. 6 illustrates an example of a message displayed on the display panel of the telecommunications apparatus.

In the latter case, a message may be displayed on the display panel 116 of the telecommunications apparatus 110 to indicate that the software has been stored in the data storing apparatus 100, as illustrated in FIG. 6, after step S205 shown in FIG. 2. When the user sees this message, the user manipulates the left button or the right button of the cursor key 115-2 in keyboard 115-1 to select "YES" or "NO" in order to instruct the data storing apparatus 100 whether to send the stored software. This instruction is confirmed by hitting the "Enter" key, and the step S206 begins. With this arrangement, the user can install the software in the telecommunications apparatus 110 at any time.

Figure 7:
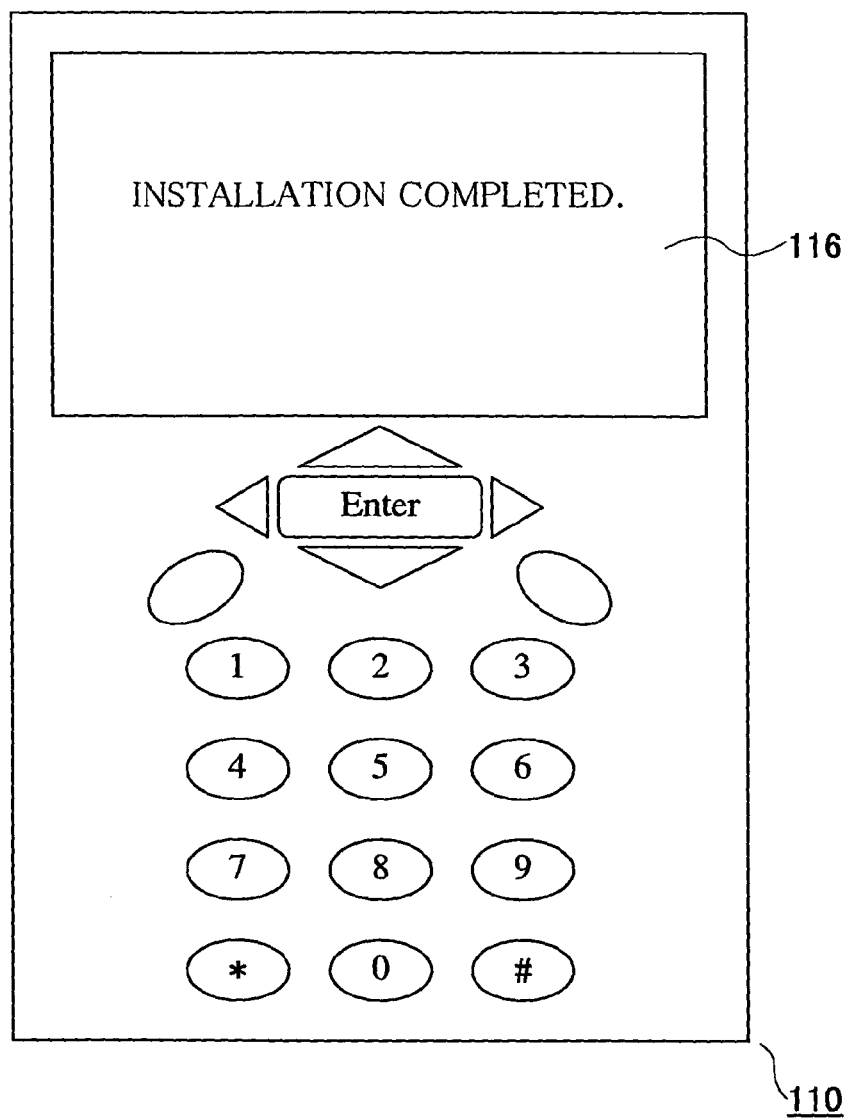
FIG. 7 illustrates another example of a message displayed on the display panel of the telecommunications apparatus.

When the software is saved in the memory 114 and installed in the telecommunications apparatus 110, the completion of installation may be displayed on the display panel 116, as illustrated in FIG. 7. The user can confirm the progress of the installation process.

If the data storing apparatus 100 is designed such that the data storage 104 is detachable from the main body, the data storage 104 is removed from the data storing apparatus 100 after the software has been stored. Then, the data storage 104 is connected to the telecommunications apparatus 110 to transmit the stored software to the telecommunications apparatus 110. The telecommunications apparatus 110 performs the step S206 and the subsequent steps (i.e., the installation of the software), while it is disconnected from the data storing apparatus 100 and is free to move.

Figure 3:
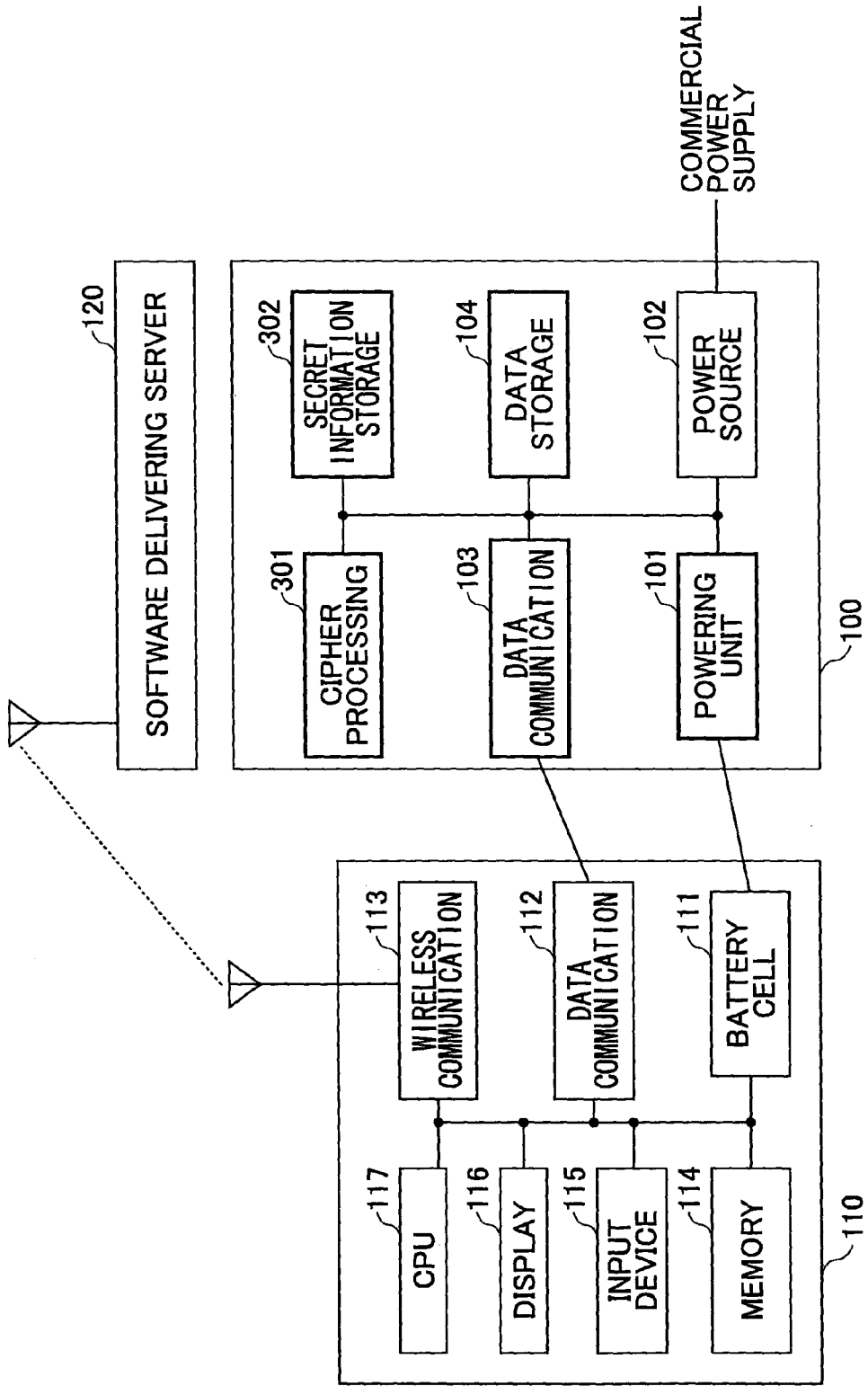
FIG. 3 is a block diagram illustrating a data storing apparatus and a telecommunications apparatus according to the second embodiment of the invention.

FIG. 3 is a block diagram illustrating a data storing apparatus 100 and a telecommunications apparatus 110 according to the second embodiment of the invention. The data storing apparatus 100 of the second embodiment has a cipher processing unit 301 and secret information storage 302.

The cipher processing unit 301 comprises a computing unit including a memory and a microprocessor, and it encrypts and decrypts data under power being supplied from the power source unit 102.

The secret information storage 302 comprises, for example, a read only memory or a flash memory, and stores an encryption key. The secret information storage 302 may be configured to be tamper-resistant so as to securely protect the encryption key. The tamper resistance restricts external access to the secret information storage 302, and prevents illegal access to or alteration of the secret information, or unauthorized operation. The secret data stored in the secret information storage 302 can be protected from being tampered with or stolen by a third party. The tamper-resistant secret information storage 302 can be realized by fabricating the devices using special materials or incorporating dummy interconnects in the devices, as described in the above-described publication "Information Security Technology and Security Assessment for Digital Money", IMES Discussion Paper Series 98-J-26, Bank of Japan, Financial Research Center, November 1998.

The other elements of the data storing apparatus 100 are the same as those explained in the first embodiment.

The telecommunications apparatus 110 has the same structure as that illustrated in the first embodiment; however, the memory 114 stores cipher processing software and key data. Accordingly, the telecommunications apparatus 110 is capable of encrypting and decrypting data. The memory 114 may also be configured to be tamper resistant, similarly to the secret information storage 302 of the data storing apparatus 100.

The same encryption key is given to the telecommunications apparatus 110 and the data storing apparatus 100, and embedded in the memory 114 and the secret information storage 302, respectively, in the manufacturing process. Prior to downloading the software, it is authenticated that the telecommunications apparatus 110 and the data storing apparatus 100 make a valid pair sharing a common key. The authentication is performed by a common key authentication method, such as a challenge/response protocol. In the second embodiment, the download process starts only when the authentication becomes successful. This arrangement prevents the software from being delivered from the software delivering server 120 to an undesirable user (or unauthorized data storing apparatus 100 and telecommunications apparatus 110).

When downloading the software, the major flow is similar to that of the first embodiment. The telecommunications apparatus 110 receives the software at the wireless communication unit 113, which software has been delivered from the server 120 in response to the request. In the second embodiment, the telecommunications apparatus 110 encrypts the received software using the encryption key and transmits the encrypted software to the data storing apparatus 100 (step S203). The telecommunications apparatus 110 may successively encrypt the data blocks transmitted from the software delivering server 120 and transmit the encrypted data blocks sequentially to the data storing apparatus 100. The data storing apparatus 100 receives the encrypted software at the data communication unit 103, and saves the encrypted software in the data storage 104, without decryption (steps S204 and S205).

Upon request from the telecommunications apparatus 110, the data storing apparatus 100 transmits the encrypted software to the telecommunications apparatus 110 (steps S206 and S207). The telecommunications apparatus 110 decrypts the software (S208) and saves the decrypted software in the memory 114 (S209).

Even though the software happens to be stolen by an unauthorized user or an unauthorized third party during data transmission between the telecommunications apparatus 110 and the data storing apparatus 100, the encrypted software cannot be decrypted. This arrangement prevents the software vendor from being damaged.

Although, in the second embodiment, the secret information storage 302 is provided in the data storing apparatus 100, the data storage 104 may function as the secret information storage, without providing a separate storage.

Figure 4:
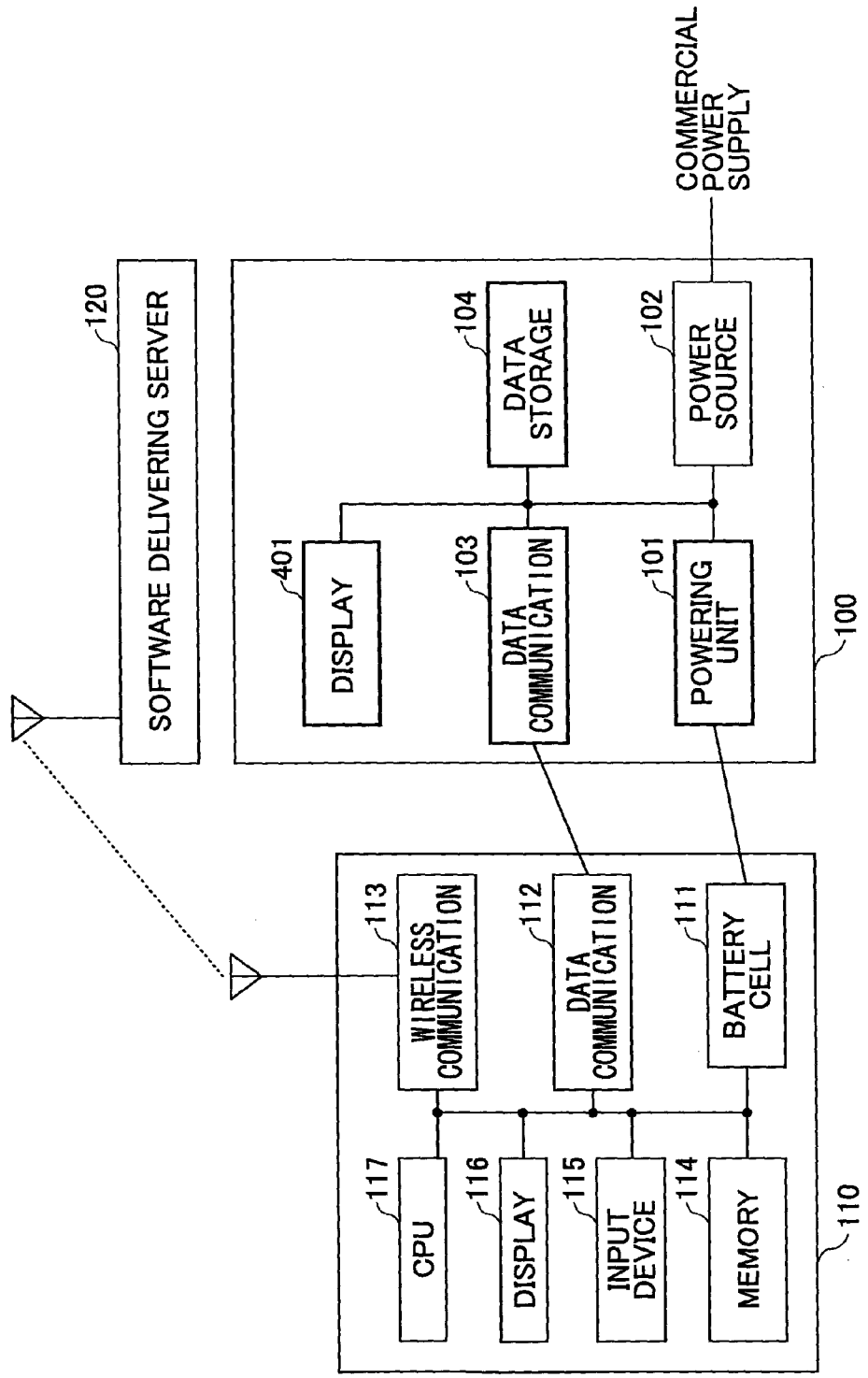
FIG. 4 is a block diagram illustrating a data storing apparatus and a telecommunications apparatus according to the third embodiment of the invention.

FIG. 4 is a block diagram illustrating a data storing apparatus 100 and a telecommunications apparatus 110 according to the third embodiment of the invention. In the third embodiment, the data storing apparatus 100 has a display unit 401.

The display unit 401 is, for example, a liquid crystal display, and displays information in response to instructions from the computing unit (not shown) of the data storing apparatus 100. The display unit 401 receives power being supplied from the power source unit 102.

The software downloading process is similar to that of the first embodiment. When the telecommunications apparatus 110 receives the software from the server 120 and transmits the software to the data storing apparatus 100 to perform the wireless downloading of the software, the data storing apparatus 100 saves the software in the data storage 104 (steps S201-S205). Simultaneously, the data storing apparatus 100 displays the title of the software on the display unit 401. The title of the software is, for example, the file name, or alternatively, the title name defined by the metadata when the software is described in a structured format, such as extensible markup language (XML). The title to be displayed may be a path name, such as a uniform resource locator (URL) indicating the logical location of the software in the software delivering server 120.

When transmitting the stored software from the data storage 104 of the data storing apparatus 100 to the telecommunications apparatus 110 (S207), the software and the title of the software may be deleted from the data storage 104 and the display unit 401, respectively. The user can confirm the current state of the data storing apparatus 100, for example, what is stored in the data storage 104, and avoid repeating installation of the same software from the data storing apparatus 100.

Figure 5:
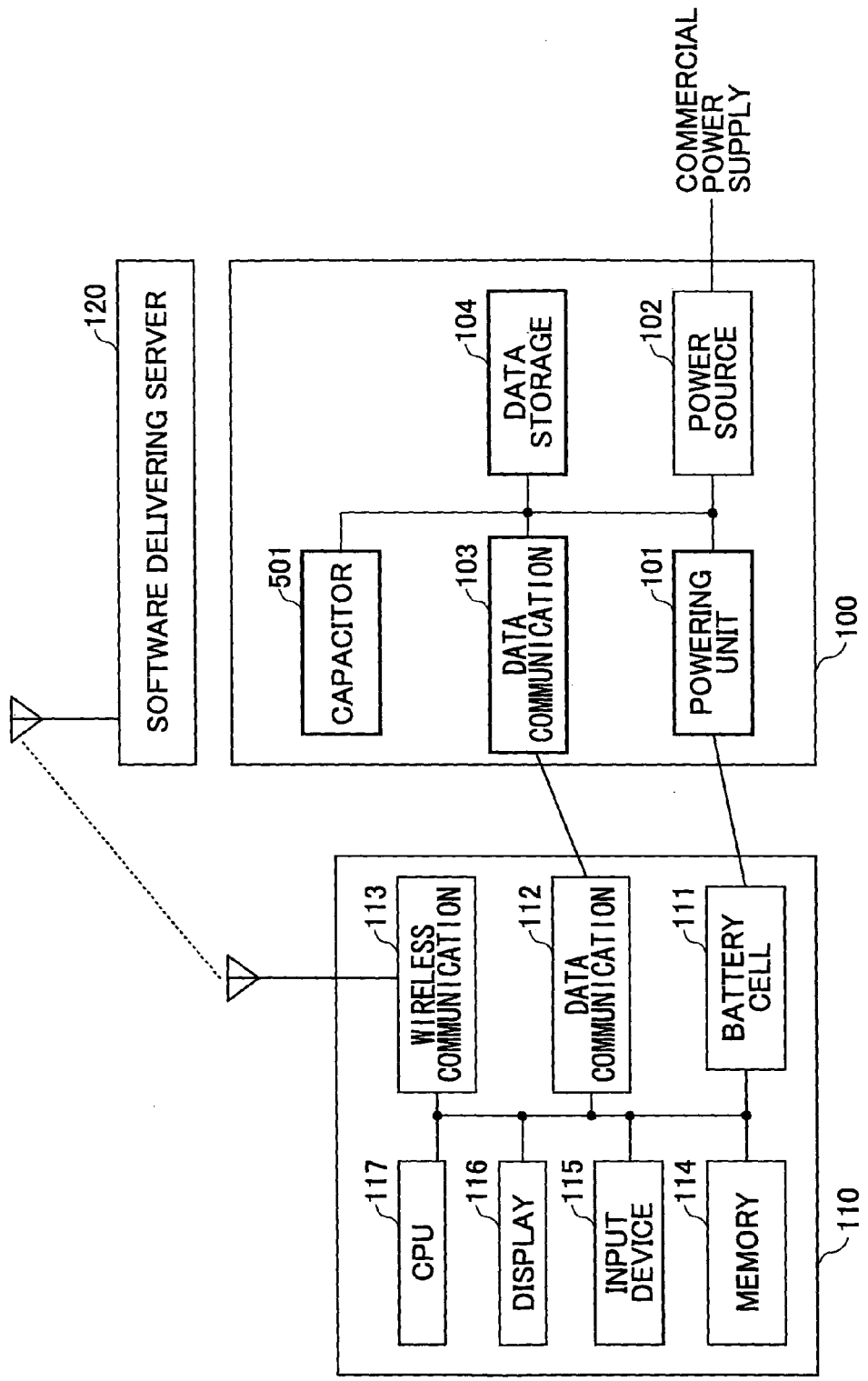
FIG. 5 is a block diagram illustrating a data storing apparatus and a telecommunications apparatus according to the fourth embodiment of the invention.

FIG. 5 is a block diagram illustrating a data storing apparatus 100 and a telecommunications apparatus 110 according to the fourth embodiment of the invention. The data storing apparatus 100 of the fourth embodiment has a capacitor 501. The capacitor 501 is structured by a secondary cell repeatedly used through electrical charge under power being supplied from the power source unit 102. Since the power source unit 102 is connected to the plug outlet of a commercial power supply, the capacitor 501 receives power from the power source unit 102 until it is fully charged.

The data storing apparatus 100 may have a display, such as a liquid crystal display or an LED (not shown), to display the charging state of the capacitor 501.

In the fourth embodiment, the components of the data storing apparatus 100 are activated and driven using the electric energy stored in the capacitor 501. The capacitor 501 also supplies power to the powering unit 101. Accordingly, the battery cell 111 of the telecommunications apparatus 110 receives power being supplied from the capacitor 501 via the powering unit 101. This arrangement guarantees reliable power even if the commercial power supply accidentally breaks down, and therefore, the download process of the software can be accomplished without fail even during breakdown.

FIG. 8 illustrates data flow and operations flow among the software delivering server 120, the telecommunications apparatus 110 and the data storing apparatus 100 according to the fifth embodiment of the invention.

The actions taken prior to downloading the software are the same as those described in the first embodiment. The software to be downloaded from the server 120 may be backbone software, including communication control software, operating systems, an Internet browser, and device drivers, or alternatively, application software, such as gaming programs.

In the fifth embodiment, the installed software "S" is updated to the latest version. Such software may be made up of program source code or object code. The software to be updated may be source code or object code that makes up a part of the originally installed software. With this arrangement, only the difference (i.e., the updated portion) is replaced, and the communication cost and memory requirement can be saved.

In FIG. 8, the telecommunications apparatus transmits a request for the update of the software "S" (referred to as S') to the software delivering server 120, via the wireless communication unit 113 (step S801).

In response to the request, the software delivering server 120 transmits the update S' to the telecommunications apparatus 110 (step S802).

The telecommunications apparatus 110 receives the update S' at the wireless communication unit 113, and subsequently supplies the update to the data communication unit 112. The data communication unit 112 transmits the update S' to the data storing apparatus 100 (step S803).

The data storing unit 100 receives the update S' at the data transmission unit 103, and inputs the update S' to the data storage 104 (step S804). The data storage 104 stores the update S' (step S805). The communications between the telecommunications apparatus 110 and the software delivering server 120 are performed using an arbitrary communication protocol, such as HTTP.

In this manner, the session between the telecommunications apparatus 110 and the software delivering server 120 is finished, and the update S' is stored in the data storage 104 of the data storing apparatus 100.

Then, the telecommunications apparatus 110 transmits a copy of the software "S" (Copy-S) from the data communication unit 112 to the data storing apparatus 100 (step S806). If the update S' is a difference file defining a part of the software "S", Copy-S may be a copy of a portion of the software "S" to be replaced, in order to save on communication cost, time, and memory space of the data storing apparatus 100.

When transmitting Copy-S to the data storing apparatus 100, the software "S" may be deleted from the memory 114. Instead of transmitting the copy of the software "S", the telecommunications apparatus 110 may transmit the software "S" itself to the data storing apparatus 100. This arrangement can save the memory space of the memory 114, and it is effective especially when the software "S" is large-volume software.

The data storing apparatus 100 receives Copy-S at the data communication unit 103 and inputs the copy to the data storage 104 (step S807). The data storage 104 stores Copy-S (step S808).

Then, the telecommunications apparatus 110 requests the data storing apparatus 100 to send the update S' to the telecommunications apparatus 110 (S809). This request may be made in response to the user's instruction.

In response to the request, the data storing apparatus 100 supplies the update S' from the data communication unit 103 to the telecommunications apparatus 110 (S810). After the transmission of the update S', the update S' may be deleted from the data storage 104, or alternatively, continuously maintained in the data storage 104.

The telecommunications apparatus 110 receives the update S' at the data communication unit 112, and supplies the software to the memory 114 (S811). The memory 114 stores and installs the update S' to replace the software "S" with the update S' (S812).

Then, it is determined whether the installation has been accomplished successfully (S813). If the installation is completed successfully (YES in S813), the process terminates.

If the installation process fails (NO in S813), the data communication unit 112 of the telecommunications apparatus 110 requests the data storing apparatus 100 to transmit Copy-S (S814). In response to the request, the data storing apparatus 100 transmits Copy-S from the data communication unit 103 to the telecommunications apparatus 110 (S815). The telecommunications apparatus 110 receives Copy-S at the data communication unit 112 and saves Copy-S in the memory 114 and installs it (S816).

In this manner, if the installation of the data fails, the software "S" is installed to restore the original state. Installation may fail due to bugs in the update S' or mismatch with other software.

The data storage 104 of the data storing apparatus 100 functions as a virtual buffer memory. Accordingly, the telecommunications apparatus 110 does not have to be furnished with a buffer memory, and portability is improved. Even if failure occurs during updating the software, the original state is recovered.

The copy of the software "S" (Copy-S) may be stored in the data storage 104 in advance. In this case, the user can request the data storing apparatus 100 to transmit Copy-S via the data communication unit 103 to the data communication unit 112 of the telecommunications apparatus 110 at any time. In response to the user's request, step S814 and the subsequent steps shown in FIG. 8 are carried out. With this arrangement, the desired version of software can be restored based upon the user's preference, without being limited by occurrence of failure while updating the software. For example, if the updated software turns out to have security defects, the updated software may not be compatible with existing software. In this case, it is useful to restore the previous state existing before the update.

If the software "S" is the entirety or a part of the operating system of the telecommunications apparatus 110, another problem occurs. When failure occurs during the software updating, the operating system does not work normally, and the step S814 and the subsequent steps cannot be performed. To avoid such a situation, the user of the telecommunications apparatus 110 may issue a reboot instruction through the input device 115. In this case, since the operating system of the telecommunications apparatus 110 does not work, the copy of the operating system (Copy-S) stored in the data storing apparatus 100 is loaded to execute the booting process.

In the above-described case, the data communication unit 112 of the telecommunications apparatus 110 may load only necessary data required to boot the apparatus 110 from the copy of the operating system (Copy-S) stored in the data storing apparatus 100.

The copy of the operating system (Copy-S) may be furnished with a repairing function. In this case, a copy of Copy-S with the repairing function is saved in the memory 114 of the telecommunications apparatus 110 such that the telecommunications apparatus 110 can boot by itself starting from the next time.

FIG. 9 and FIG. 10 illustrate the structures and operations of the data storing apparatus and telecommunications apparatus according to the sixth embodiment of the invention. In the sixth embodiment, the telecommunications apparatus 110 verifies the hardware structure and the software structure, and transmits the verification result to the software delivering server 120. The software delivering server 120 determines the version of software to be transmitted, based upon the verification result. Verification of the hardware structure and the software structure is carried out by a reliable method.

As illustrated in FIG. 9, the telecommunications apparatus 110 has a trusted platform module (TPM) 901, in addition to the elements described in the first embodiment.

The TPM 901 measures integrity of the telecommunications apparatus 110 using a known technique, for example, one disclosed in "Trusted Computing Platform Alliance (TCPA) Main Specification Version 1.1b" by Compaq Computer Corporation, Hewlett-Packard Company, IBM Corporation, Intel Corporation, and Microsoft Corporation, [online], Feb. 22, 2002.

Measurement of integrity is to inspect the hardware structure and/or the software structure of the telecommunications apparatus 110 to determine whether it is expected that the hardware and/or the software will operate correctly as supposed. The hardware includes external devices. Accordingly, in the sixth embodiment, the data storing apparatus 100 is also inspected. The software may be backbone software, including communication control software, operating systems, an Internet browser, and device drivers, or alternatively application software including gaming programs. In the integrity measurement, the module structure and the version of the software may be inspected.

FIG. 10 illustrates data flow and operations flow during the download process according to the sixth embodiment of the invention. The same steps as those in the first embodiment are denoted by the same numerical symbols.

The telecommunications apparatus 110 transmits a request for delivery of desired software "S" to the software delivering server 120 (S201).

In response to the request, the software delivering server 120 requests the telecommunications apparatus 110 to supply an integrity measurement result (S1001). The telecommunications apparatus 110 measures integrity using TPM 901, and transmits the measurement result to the software delivering server 120 via the wireless communication unit 113 (S1002).

In the integrity measurement, the TPM 901 measures the integrity of the data storing apparatus 100, which is an external device for the telecommunications apparatus 110, and places the measurement result in the measurement information to be transmitted to the software delivering server 120. This arrangement prevents potential problems, such as outflow of illegal copy, caused by failure or structural alteration of the data storing apparatus 100.

The software delivering server 120 verifies the integrity measurement result supplied from the telecommunications apparatus 110 (S1003). The integrity is measured using a technique disclosed in, for example, Siani Pearson, et al., "Trusted Computing Platforms: TCPA technology in context", published July 2002 by Prentice Hall PTR, ISBN 0-13-009220-7.

If the integrity of the telecommunications apparatus 110 is confirmed through verification (YES in S1004), the software delivering server 120 transmits the software "S" to the telecommunications apparatus 110 (S1005), and the subsequent steps, which are the same as those in the first embodiment, are carried out.

If the integrity of the telecommunications apparatus 110 does not satisfy the prescribed delivery condition (NO in S1004), it is supposed that the telecommunications apparatus 110 is in an unreliable state due to, for example, virus infection, and therefore, the software is not delivered to the telecommunications apparatus 110. In this case, a message indicating that the software "S" cannot be delivered is transmitted from the software delivering server 120 to the telecommunications apparatus 110 (S1006), and the process terminates.

In the sixth embodiment, the TPM 901 of the telecommunications apparatus 110 may be configured to inspect the structure and the version of the software already installed in the telecommunications apparatus 110, and transmits the inspection result to the software delivering server 120. In this case, the software delivering server 120 may determine whether the delivery condition of the software "S" is satisfied based on the software structure or the version information of the already installed software during the verification.

The delivery condition is, for example, that the requested software "S" is a newer version than similar software already installed in the telecommunications apparatus 110, or that the already installed software structure is consistent with the policy of the software vendor.

As has been described above, the data storing apparatus and the telecommunications apparatus of the present invention allow the function of the telecommunications apparatus to be expanded by receiving software from a server via a wireless network and installing the software in a reliable manner.

This patent application is based on and claims the benefit of the earlier filing date of Japanese Patent Application No. 2003-398028 filed Nov. 27, 2003, the entire contents of which are hereby incorporated by reference.

What is claimed is:

1. A data storing apparatus connectable to a telecommunication apparatus for supplying direct current power to the telecommunication apparatus, comprising:

a power source unit that converts an alternating current into a direct current;

a powering unit configured to supply the direct current power to the telecommunications apparatus connected to the data storing apparatus;

a secret information storing unit configured to store a common key used for authenticating data communicating between the data storing apparatus and the telecommunications apparatus via a data communication unit of the data storing apparatus;

the said data communication unit configured to receive the data from the telecommunications apparatus, which receives the data from an information provider via a wireless network in response to a request from the telecommunications apparatus; wherein the data including an update of a first data item which is downloaded and encrypted using the common key by the telecommunications apparatus; wherein the download starts only when an authentication by valid pair sharing of the common key becomes successful; and a data storage configured to store the encrypted update of the first data item received at the data storing apparatus, the data storage further configured to detach from the data storing apparatus and independently connect directly to the telecommunications apparatus, wherein the data storing apparatus sends the encrypted update of the first data item stored in the data storage to the telecommunications apparatus in response to a request from the telecommunications apparatus.

2. The data storing apparatus of claim 1, wherein the secret information storing unit is tamper-resistant.

3. The data storing apparatus of claim 1, further comprising:
a display configured to display information about the data, which is stored in the data storage.

4. The data storing apparatus of claim 1, further comprising:
a capacitor configured to supply the direct current power to the powering unit, the data communication unit, and the data storage.

5. The data storing apparatus of claim 1, wherein the data communication unit receives a copy of the first data item having been stored in the telecommunications apparatus when the first data item is updated in the telecommunications apparatus, and the data storage stores the copy of the first data item until the updating is completed in the telecommunications apparatus.

6. The data storing apparatus of claim 5, wherein the data communication unit transmits the copy of the first data item to the telecommunications apparatus when a second data item is required to boot the telecommunications apparatus.

7. The data storing apparatus of claim 1, further comprising:
a recess to hold the telecommunications apparatus during a reception of the update of the first data item from the telecommunications apparatus.

8. The data storing apparatus of claim 1, wherein, when the telecommunications apparatus downloads the update of the first data item from the information provider via the wireless network, the data communication unit of the data storing apparatus is connected to the telecommunications apparatus via a physical connector and the power source unit of the data storing apparatus is connected to a plug outlet of a power supply.

9. The data storing apparatus of claim 1, wherein the data storage is a memory card.

10. A telecommunications apparatus, comprising:
a memory configured to store a common key used for authenticating data communicating between an external data storing apparatus and the telecommunications apparatus;
a wireless communication unit configured to transmit a request for downloading an update of a data item from an information provider via a wireless network; the download starts via a data communication unit of the telecommunications apparatus only when an authentication by valid pair sharing of the common key between the telecommunications apparatus and the data storing apparatus becomes successful;
a data communication unit of the external data storing apparatus receives the downloaded update from the said data communication unit of the telecommunications apparatus, which encrypts the downloaded update of the data item using the common key, and transmit the encrypted downloaded update of the data item to a data storage connected to the external data storing apparatus; the data storage being configured to detach from the external data storing apparatus and independently connect directly to the telecommunications apparatus; and
a battery cell configured to be charged by the external data storing apparatus, wherein
the telecommunications apparatus requests the external data storing apparatus to send the encrypted downloaded update of the data item, decrypts the encrypted downloaded update of the data item using the common key, and stores the downloaded update of the data item in the memory.

11. The telecommunications apparatus of claim 10, further comprising:
an integrity measuring unit configured to measure an integrity of the telecommunications apparatus, wherein the wireless communication unit transmits a measuring result of the integrity to the information provider via the wireless network.

12. A data transmission method, comprising:
charging a battery cell of a telecommunications apparatus by a power source from an external data storing apparatus;
storing a common key used for authenticating data communicating between the external data storing apparatus and the telecommunications apparatus;
downloading an update of a data item to the telecommunications apparatus from an information provider via a wireless network in response to a request from the telecommunications apparatus; the downloading starts only when an authentication by valid pair sharing of the common key between the telecommunications apparatus and the data storing apparatus becomes successful;
encrypting the update of the data item using the common key;
storing the encrypted update of the data item in a data storage connected to the external data storing apparatus, connected to the telecommunications apparatus; the data storage being configured to detach from the external data storing apparatus and independently connect directly to the telecommunications apparatus;
requesting the external data storing apparatus to send the stored encrypted update of the data item to the telecommunications apparatus when the storing of the update of the data item in the data storage of the data storing apparatus is finished; and
decrypting the encrypted update of the data item and storing the update of the data item in the telecommunications apparatus.

* * * * *